US011803099B2

(12) United States Patent
Seo et al.

(10) Patent No.: US 11,803,099 B2
(45) Date of Patent: Oct. 31, 2023

(54) CAMERA MODULE

(71) Applicant: SAMSUNG ELECTRO-MECHANICS CO., LTD., Suwon-si (KR)

(72) Inventors: Bo Sung Seo, Suwon-si (KR); Nam Ki Park, Suwon-si (KR); Young Bok Yoon, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 92 days.

(21) Appl. No.: 17/505,845

(22) Filed: Oct. 20, 2021

(65) Prior Publication Data

US 2022/0155652 A1 May 19, 2022

(30) Foreign Application Priority Data

Nov. 18, 2020 (KR) .......................... 10-2020-0154294
Feb. 15, 2021 (KR) .......................... 10-2021-0020121

(51) Int. Cl.
*G03B 5/04* (2021.01)
*G02B 27/64* (2006.01)
*G02B 7/02* (2021.01)

(52) U.S. Cl.
CPC ................. *G03B 5/04* (2013.01); *G02B 7/02* (2013.01); *G02B 27/646* (2013.01); *G03B 2205/0015* (2013.01); *G03B 2205/0069* (2013.01)

(58) Field of Classification Search
None
See application file for complete search history.

(56) References Cited

U.S. PATENT DOCUMENTS

| 11,086,195 B2* | 8/2021 | Jeong ..................... G03B 13/34 |
| 2015/0049209 A1 | 2/2015 | Hwang et al. |
| 2020/0333686 A1* | 10/2020 | Kim ........................ G03B 30/00 |
| 2021/0173223 A1* | 6/2021 | Seo ......................... G03B 13/36 |
| 2021/0333689 A1* | 10/2021 | Jeong ...................... G02B 7/04 |

FOREIGN PATENT DOCUMENTS

| KR | 10-2015-0020951 A | 2/2015 | |
| KR | 10-2015-0080367 A | 7/2015 | |
| KR | 10-2015-0138034 A | 12/2015 | |
| KR | 10-2019-0061439 A | 6/2019 | |
| KR | 1020190061439 A * | 6/2019 | .............. G03B 5/04 |
| KR | 10-2132018 B1 | 7/2020 | |
| KR | 10-2020-0123599 A | 10/2020 | |

OTHER PUBLICATIONS

Korean Office Action dated May 16, 2022, in counterpart Korean Patent Application No. 10-2021-0020121 (6 pages in English and 5 pages in Korean).

\* cited by examiner

*Primary Examiner* — Derek S. Chapel
(74) *Attorney, Agent, or Firm* — NSIP Law

(57) ABSTRACT

A camera module includes: a housing; a carrier disposed inside the housing and movable in an optical axis direction; and a lens module disposed inside the carrier and movable in directions perpendicular to the optical axis direction, and configured to implement optical image stabilization. The lens module includes a frame disposed on the carrier, and a lens holder disposed on the frame and having a lens barrel. The frame is configured to be supported by a first ball member interposed between the frame and the carrier on a side surface of the carrier parallel to the optical axis direction.

19 Claims, 13 Drawing Sheets

CAMERA MODULE

CROSS-REFERENCE TO RELATED APPLICATIONS

This application claims the benefit under 35 U.S.C. § 119(a) of Korean Patent Application Nos. 10-2020-0154294 and 10-2021-0020121 filed on Nov. 18, 2020 and Feb. 15, 2021, respectively, in the Korean Intellectual Property Office, the entire disclosures of which are incorporated herein by reference for all purposes.

BACKGROUND

1. Field

The following description relates to a camera module.

2. Description of Related Art

A microminiaturized camera module is being employed in mobile communication terminals such as tablet PCs, laptop computers, and the like, as well as in smartphones. As mobile communication terminals become smaller, image quality deteriorates because an effect on an unstable optical image when capturing a moving image is greater. Therefore, an optical image stabilization technology may be employed to obtain a clear image.

When an optical image is unstable during image capturing, an OIS actuator to which Optical Image Stabilization (OIS) technology is applied may be used to stabilize an unstable optical image. The OIS actuator may move a lens module in a direction perpendicular to an optical axis to stabilize an unstable image.

In order to implement improved OIS and thereby improve camera performance, it is desirable for a structure in which the lens module moves to have a longer stroke in a direction perpendicular to the optical axis. However, in a case in which an OIS actuator using a magnet and a coil is employed for miniaturization and accurate driving, when the stroke of the lens module becomes long, a gap between the magnet and the coil is increased such that it may be difficult to drive the actuator.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a camera module includes: a housing; a carrier disposed inside the housing and movable in an optical axis direction; and a lens module disposed inside the carrier and movable in directions perpendicular to the optical axis direction, and configured to implement optical image stabilization. The lens module includes a frame disposed on the carrier, and a lens holder disposed on the frame and having a lens barrel. The frame is configured to be supported by a first ball member interposed between the frame and the carrier on a side surface of the carrier parallel to the optical axis direction.

A size of a gap between the side surface of the carrier and a side surface of the frame opposing the side surface of the carrier may be continuously maintained during driving of an optical image stabilization actuator.

The frame may be movable in a first direction perpendicular to the optical axis direction with respect to the carrier.

The camera module of claim 3, may further include a first magnet disposed on a side surface of the frame opposing the side surface of the carrier.

The first magnet may be magnetized to have N and S poles in the first direction.

The camera module may further include a first coil disposed in the housing to oppose the first magnet.

The first coil may include at least two first coils sequentially disposed in the first direction.

The first magnet may include at least two pairs of the N and S poles. Each of the at least two first coils may be disposed to oppose a respective pair of N and S poles among the at least two pairs of N and S poles.

The camera module may further include a first yoke disposed in the housing such that attractive force with the first magnet acts on a rear surface of the first coil opposing the first magnet.

The lens holder may be supported by a second ball member interposed between opposing surfaces of the lens holder and the frame in the optical axis direction.

The carrier may be supported by a third ball member interposed between the carrier and a side surface of the housing parallel to the optical axis direction.

The first ball member and the third ball member may be disposed in opposing positions with respect to an optical axis.

The camera module may further include a third magnet disposed on another side surface of the carrier, and a third coil disposed in the housing to oppose the third magnet.

The third magnet may be magnetized so that a surface opposite to the third coil has N and S poles in the optical axis direction.

In another general aspect, a camera module includes: a box-shaped housing; a carrier disposed inside the housing and movable in an optical axis direction; a lens module disposed inside the carrier and movable in directions perpendicular to the optical axis direction, the lens module including a frame disposed on the carrier, and a lens holder disposed on the frame and including a lens barrel; first and third coils respectively disposed on first and third opposing sides with respect to the optical axis; second and fourth coils respectively disposed on second and fourth opposing sides with respect to the optical axis; a first yoke disposed on a rear surface of the first coil such that the carrier is supported on a side surface of the housing by attractive force with a first magnet opposing the first coil on the carrier; and a third yoke disposed on a rear surface of the third coil such that the frame is supported on a side surface of the carrier by attractive force with a third magnet opposing the third coil on the frame. Ball members are interposed between the carrier and the housing and between the frame and the carrier, respectively. The lens holder includes second and fourth magnets opposing the second and fourth coils, respectively.

The first magnet may be magnetized to have N and S poles in an optical axis direction. The third magnet may be magnetized to have N and S poles in a first direction perpendicular to the optical axis. The second and fourth magnets may be magnetized to have N and S poles in a second direction perpendicular to both the optical axis and the first direction.

The first and third coils may be respectively disposed on first and third opposing side surfaces of the housing, and the second and fourth coils may be respectively disposed on second and fourth opposing side surfaces of the housing.

The first coil and the first magnet may be configured to interact with each other to move the carrier in the optical axis direction.

The second coil and the second magnet may be configured to interact with each other to move the lens module in a first direction among the directions perpendicular to the optical axis. The third coil and the third magnet may be configured to interact with each other to move the lens module in a second direction, among the directions perpendicular to the optical axis. The fourth coil and the fourth magnet may be configured to interact with each other to move the lens module in the first direction.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
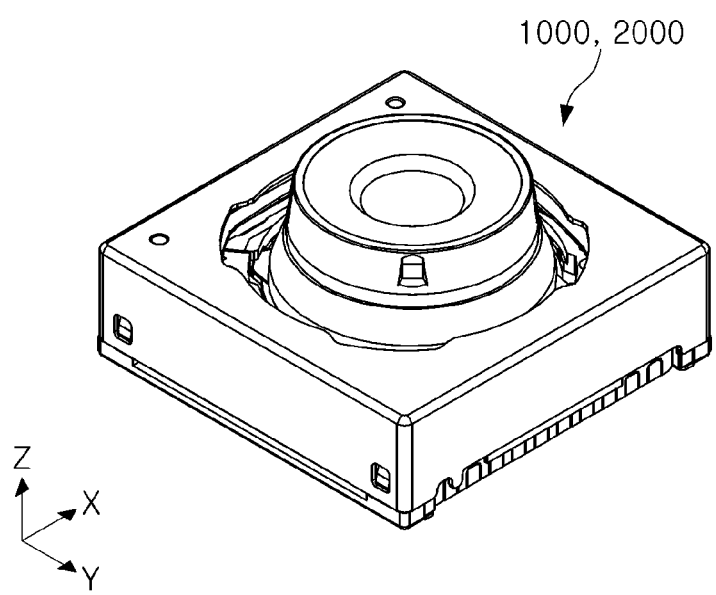
FIG. 1 is a perspective view of a camera modules in an assembled state, according to an embodiment.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Herein, it is to be noted that use of the term "may" with respect to an embodiment or example, e.g., as to what an embodiment or example may include or implement, means that at least one embodiment or example exists in which such a feature is included or implemented while all examples and examples are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

The description herein relates to a camera module, which may be applied to portable electronic devices such as a mobile communication terminal, a smartphone, a table PC, and the like, for example.

The camera module is, for example, an optical device for taking still pictures or moving pictures, and includes a lens configured to refract light reflected from a subject, and a lens driving device configured to move the lens to adjust a focus or correct shaking.

Figure 2:
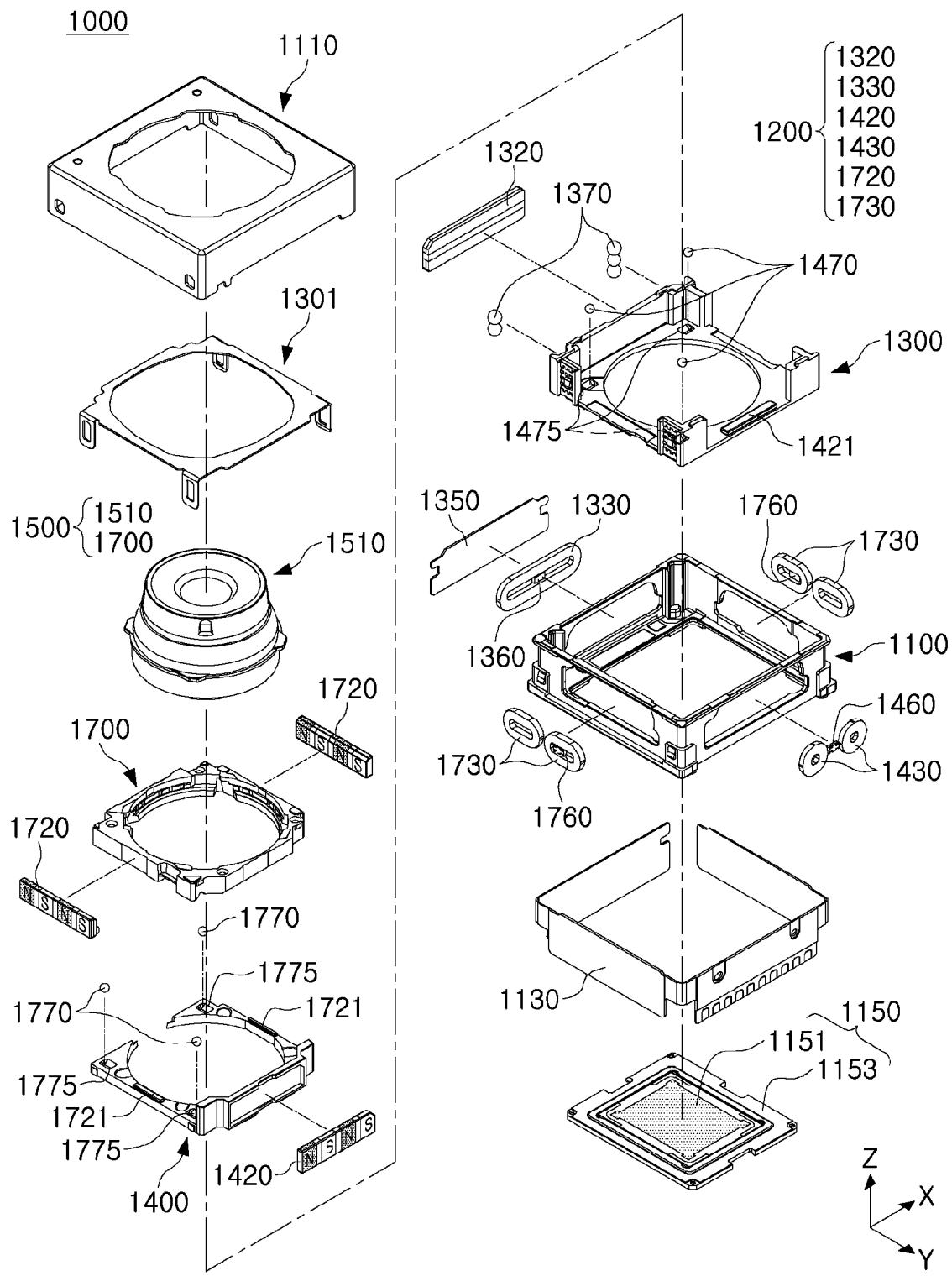
FIG. 2 is an exploded perspective view of a camera module, according to an embodiment.
Figure 8:
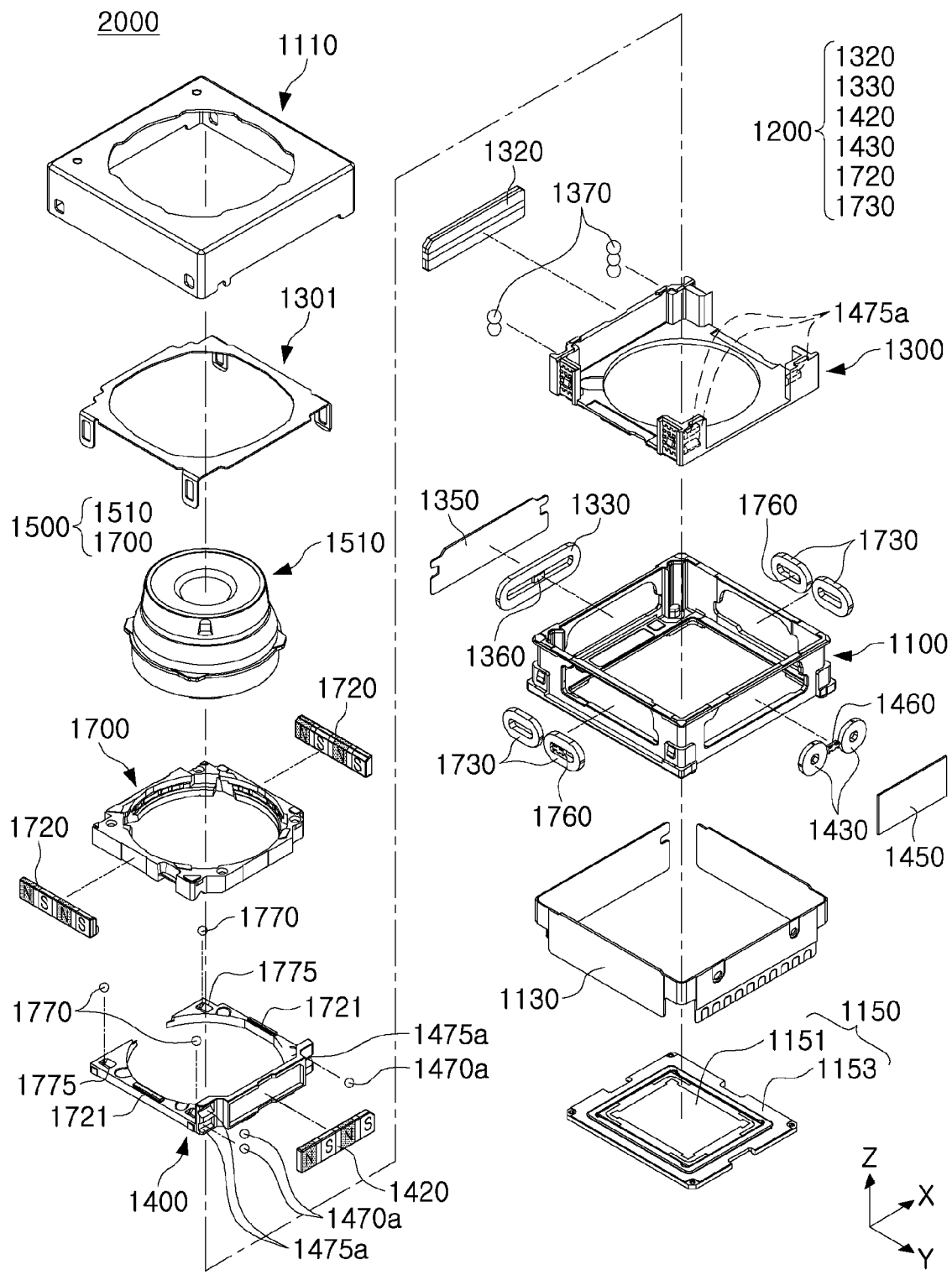
FIG. 8 is an exploded perspective view of a camera module, according to an embodiment.

FIG. 1 is a perspective view of camera modules 1000 and 2000 in an assembled state, according to an embodiment. FIG. 2 is an exploded perspective view of the camera module 1000, according to an embodiment. FIG. 8 is an exploded perspective view of the camera module 2000, according to an embodiment.

Referring to FIGS. 1, 2 and 8, the camera modules 1000 and 2000 may include a housing 1100, a lens module 1500 including a lens barrel 1510 and a lens holder 1700 accommodated in the housing 1100, a lens driving device 1200 configured to move the lens module 1500, and an image sensor unit 1150 configured to convert light incident through the lens barrel 1510 into an electrical signal. In addition, the camera modules 1000 and 2000 may further include a case 1110 and an upper cover 1301 covering the housing 1100 from the top.

The lens barrel 1510 may have a hollow cylindrical shape so that a plurality of lenses for imaging a subject can be accommodated therein, but this disclosure is not limited to such a configuration. For example, the lens barrel may have an exterior that is partially cut-away, and a circular lens or a D-cut lens having one side surface that is partially cut-out may be provided inside the lens barrel, and a plurality of lenses may be mounted in the lens barrel 1510 along the optical axis. As many lenses as necessary may be provided, according to the design of the lens barrel 1510, and each of the lenses may have optical characteristics such as the same or different refractive indices.

The lens driving device 1200 is a device configured to move the lens barrel 1510 in an optical axis direction or in a direction perpendicular to the optical axis direction.

For example, the lens driving device 1200 may adjust a focus by moving the lens barrel 1510 in an optical axis (Z axis) direction, and may correct shaking during imaging by moving the lens module 200 in a direction, perpendicular to the optical axis (Z axis).

The lens driving device 1200 includes a focus adjustment unit (an auto focus adjustment unit) configured to adjust a focus and a shake correction unit (an optical image stabilization unit) configured to stabilize an optical image.

The image sensor unit 1150 is a device configured to convert light incident through the lens barrel 1510 into an electrical signal.

For example, the image sensor unit 1150 may include an image sensor 1151 and a printed circuit board 1153 connected to the image sensor 1151, and may further include an infrared filter.

The lens module 1500, including the lens barrel 1510, and the lens driving device 1200 are accommodated in the housing 1100.

For example, the housing 1100 has an open upper and lower portions, and the lens module 1500 and the lens driving device 1200 may be disposed in the housing 1100. The image sensor unit 1150 may be coupled to a lower portion of the housing 1100.

The case 1110 is coupled to the housing 1100 to surround an outer surface of the housing 1100, and protects internal components of the camera module 1000/2000. In addition, the case 1110 may shield electromagnetic waves.

For example, the case 1100 may shield the electromagnetic waves so that the electromagnetic waves generated by the camera module 1000/2000 do not affect other electronic components in a portable electronic device in which the camera module 1000/2000 is mounted.

In addition, since various electronic components are mounted in the portable electronic device in addition to the camera module, the case 1100 may shield the electromagnetic waves so that the electromagnetic waves generated by these electronic components do not affect the camera module.

In addition, since various electronic components are mounted in the portable electronic device in addition to the camera module 1000/2000, the case 1100 may shield the electromagnetic waves so that the electromagnetic waves generated by these electronic components do not affect the camera module 1000/2000.

The lens driving device 1200 may include a focus adjustment unit configured to perform automatic focus adjustment by moving a carrier 1300 in an optical axis direction and an optical image stabilization unit configured to perform optical image stabilization by moving the lens module 1500, which is disposed inside the carrier 1300, in a direction perpendicular to the optical axis direction.

The focus adjustment unit may include a structure configured to generate driving force to move the carrier 1300, with the lens module 1500 accommodated therein, in an optical axis (Z-axis) direction. However, although not shown, a camera module of a modified embodiment includes the lens module 1500 disposed in the housing 1100, but does not include a separate carrier. In such an embodiment, the lens module 1500 may perform only optical image stabilization inside the housing 1100 without adjusting the focus.

A driving unit of the focus adjustment unit may include a magnet 1320 and a focus adjustment driving coil 1330. The magnet 1320 may be mounted on the carrier 1300. For example, the magnet 1320 may be mounted on one surface of the carrier 1300. The magnet 1320 and the focus adjustment driving coil 1330 may be disposed to face each other in a direction perpendicular to an optical axis direction. In addition, the magnet 1320 may be magnetized so that a surface opposite to the focus adjustment driving coil 1330 has N and S poles in the optical axis direction.

The focus adjustment driving coil 1330 may be mounted on one side surface of the housing 1100. For example, the housing 1100 may have a rectangular box shape having four side surfaces, and the focus adjustment driving coil 1330 may be disposed on one of the four side surfaces, parallel to the optical axis direction.

For example, the focus adjustment driving coil 1330 may be mounted on the housing 1100 via a substrate 1130. The focus adjustment driving coil 1330 may be fixed to the substrate 1130, and the substrate 1130 may be fixed to the housing 1100 in a state in which driving coils of the optical image stabilization unit to be described below are also fixed to the substrate 1130.

The magnet 1320 may be a movable member mounted on the carrier 1300 to move in the optical axis (Z axis) direction together with the carrier 1300, and the focus adjustment driving coil 1330 may be a fixed member fixed to the housing 1100. However, this disclosure is not limited to such a configuration, and positions of the magnet 1320 and the focus adjustment driving coil 1330 may be exchanged.

When power is applied to the focus adjustment driving coil 1330, the carrier 1300 may be moved in the optical axis (Z axis) direction by electromagnetic force between the magnet 1320 and the focus adjustment driving coil 1330 in the optical axis (Z-axis) direction. Accordingly, the focus adjustment driving coil 1330 may be magnetized to have N and S poles in the optical axis direction.

Since the lens barrel 1510 is accommodated in the carrier 1300, the lens barrel 1510 is also moved in the optical axis (Z axis) direction by the movement of the carrier 1300.

A ball member 1370 is disposed between opposing surfaces of the carrier 1300 and the housing 1100 in a direction perpendicular to the optical axis direction. The ball member 1370 reduces friction by sliding or rolling between the carrier 1300 and the housing 1100 when the carrier 1300 is moved. The ball member 1370 may have a ball shape. The ball member 1370 may be disposed on both sides of the magnet 1320. That is, two ball members 1370 may be disposed on both sides of the magnet 1320, respectively.

A yoke 1350 is disposed in the housing 1100. For example, the yoke 1350 may be disposed to face the magnet 1320 with the focus adjustment driving coil 1330 interposed therebetween. In other words, the focus adjustment driving coil 1330 and the magnet 1320 may be disposed to oppose each other, and the yoke 1350 may be disposed on a rear surface of the focus adjustment driving coil 1330 so that the carrier 1300 may be closely supported by the ball member 1370 in the housing 2100 by attractive force with the magnet 1320.

Attractive force acts between the yoke 1350 and the magnet 1320 in a direction perpendicular to the optical axis (Z axis). Accordingly, the ball member 1370 may be maintained in contact with the carrier 1300 and the housing 1100 by the attractive force between the yoke 1350 and the magnet 1320.

In addition, the yoke 1350 also performs a function to focus magnetic force of the magnet 1320, and, thus, it is possible to prevent a magnetic flux from leaking externally. In the disclosure herein, a closed-loop control method for detecting a position of the lens barrel 1510, more specifically, the carrier 1300, to feed back the position of the lens barrel 1510, is used.

Accordingly, the position sensor 1360 is provided for closed-loop control. The position sensor 1360 may be a magnetic sensor, for example, a Hall sensor, or the like.

The position sensor 1360 may be disposed inside or outside of the focus adjustment driving coil 1330, and the position sensor 1360 may be mounted on the substrate 1130, on which the focus adjustment driving coil 1330 is mounted.

Referring to FIGS. 2 and 4 to 6, an optical image stabilization unit among lens driving devices 1200, according an embodiment, is disclosed.

The lens driving device 1200 may include a focus adjustment unit configured to move the carrier 1300 in an optical axis direction to perform automatic focus adjustment and an optical image stabilization unit configured to move the lens module 1500, which is disposed inside the carrier 1300 in a direction crossing (vertical) to the optical axis direction to perform optical image stabilization.

The optical image stabilization unit includes a structure configured to generate driving force to move the lens module 1500, accommodated in the carrier 1300, in a first direction (X axis direction) and a second direction (Y axis direction), perpendicular to the optical axis (Z axis). Here, the first direction and the second direction may be perpendicular to each other.

The optical image stabilization unit is used to correct blurring of an image or shaking of a video due to factors such as a user's hand-shake when capturing an image or video. For example, the optical image stabilization unit stabilizes an optical image by imparting a relative displacement corresponding to the shaking to the lens barrel 1510, when shaking occurs during image capturing due to a user's hand-shake, or the like. For example, the optical image stabilization unit corrects shaking by moving the lens barrel 1510 in a direction perpendicular to the optical axis (Z-axis).

The optical image stabilization unit may include a frame 1400 and the lens holder 1700 to which the lens barrel 1510 is coupled. The frame 1400 and the lens holder 1700 are sequentially disposed in the carrier 1300. The carrier 1300 may include the upper cover 1301, which is closed from the top with the frame 1400 and the lens module 1500 disposed therein.

In the optical image stabilization unit of this embodiment, since the frame 1400 and the lens holder 1700 move in the first direction (X-axis direction) and the second direction (Y-axis direction), respectively, in a state shown in the drawings, the lens barrel 1510 is moved according to the movement of the frame 1400 and the lens holder 1700 to implement optical image stabilization.

When the frame 1400 moves in the first direction (X-axis direction) or the lens holder 1700 moves in the second direction (Y-axis direction), the lens holder 1700, to which the lens barrel 1510 is fixed, moves together with the lens barrel 1510. That is, since the lens barrel 1510 is fixed to the lens holder 1700, the lens barrel 1510 naturally moves along with the movement of the lens holder 1700. Since the lens barrel 1510 moves in a state in which the lens holder 1700 is supported by the frame 1400, even when the frame 1400 moves, the lens barrel 1510 moves together with the frame 1400.

Due to the structure of the frame 1400, the lens holder 1700, and the lens barrel 1510 described above, when the frame 1400 moves in the first direction (X axis direction) or the lens holder 1700 moves in the second direction (Y axis direction), the lens barrel 1510 moves together with the frame 1400 or the lens holder 1700, and shaking may be corrected.

The driving unit of the optical image stabilization unit includes a first driving unit configured to drive the frame 1400 and a second driving unit driving configured to drive lens holder 1700.

The carrier 1300, the frame 1400, and the lens holder 1700 are sequentially mounted in the optical axis direction. The frame 1400 is configured to be movable in the first direction (X-axis direction) perpendicular to the optical axis direction with respect to the carrier 1300, and the lens holder 1700 is configured to be movable in the second direction (Y-axis direction) perpendicular to the optical axis direction with respect to the frame 1400.

Accordingly, at least three first ball members 1470 and at least three second ball members 1770 may be respectively disposed between the opposing surfaces of the carrier 1300 and the frame 1400 and the opposing surfaces of the frame 1400 and the lens holder 1700 for rolling or sliding movement, to facilitate movement of the frame 1400 and the lens holder 1700. That is, at least three first ball members 1470 may be disposed between the opposing surfaces of the carrier 1300 and the frame 1400 in the optical axis direction, and at least three second ball members 1770 may be disposed between the opposing surfaces of the frame 1400 and the lens holder 1700 in the optical axis direction.

The carrier 1300, the frame 1400, and the lens holder 1700, which are sequentially disposed in the optical axis direction, may be maintained in close contact with each other in the optical axis direction. To this end, an upper magnetic material and a lower magnetic material are respectively provided on opposing surfaces of the carrier 1300 and the frame 1400 in the optical axis direction and opposing surfaces of the frame 1400 and the lens holder 1700 in the optical axis direction to face each other, respectively, such that attractive force acting in the optical axis direction may be formed For example, both the upper magnetic material and the lower magnetic material may be magnets so that attractive forces act, or one of the upper magnetic material and the lower magnetic material may a magnet and the other one of the upper magnetic material and the lower magnetic material may be a yoke having magnetism.

In this case, the upper magnetic material may be first and second magnets 1420 and 1720 for driving optical image stabilization provided in the frame 1400 or the lens holder 1700, and in this case, a yoke 1421 may be provided on the carrier 1300 to face the first magnet 1420 in the optical axis direction, and a yoke 1721 may be provided on the frame 1400 to face the second magnet 1720 in the optical axis direction.

The frame 1400 includes a first magnet 1420, and the first magnet 1420 is disposed to face the first coil 1430, which is disposed in the housing 1100, in the second direction (Y axis direction) perpendicular to the optical axis direction. The first coil 1430 may be mounted on a side surface of the housing 1100. For example, the first coil 1430 may be installed to face the focus adjustment driving coil 1330 on a side opposite to one side on which the focus adjustment driving coil 1330 is installed.

For example, the housing 1100 may be in a shape of a square box having four side surfaces, and the focus adjustment driving coil 1330 may be disposed on one side surface parallel to an optical axis direction, and a first coil 1430 may be installed on the other side surface parallel to the optical axis direction and located on the opposite side of the one side surface.

The first magnet 1420 is magnetized to have at least N and S poles in the first direction (X axis direction) in which a surface opposite to the first coil 1430 is perpendicular to the optical axis direction. Accordingly, when power is applied to the first coil 1430, the frame 1400 generates force to move in the first direction (X-axis direction) according to an electromagnetic interaction between the first magnet 1420 and the first coil 1430.

One or two or more first coils 1430 may be disposed on the side surface of the housing 1100, and correspondingly, one or two or more first magnets 1420 may be disposed to face the one or two or more first coils 1430.

In addition, the lens holder 1700 includes a second magnet 1720, and the second magnet 1720 is disposed to face the second coil 1730 in the first direction (X axis direction) perpendicular to the optical axis direction. The second coil 1730 may be mounted on the other two side surfaces of the housing 1100. For example, the second coil 1730 may be mounted on all of the other side surfaces between the one side surface and the other side surface on which the focus adjustment driving coil 1330 and the first coil 1430 are respectively installed. That is, the second coil 1730 may be installed in pairs facing each other on the other side surfaces facing each other.

For example, the housing 1100 may be in a shape of a square box having four side surfaces, and the focus adjustment driving coil 1330 may be disposed on one side surface of the housing 1100, parallel to the optical axis direction, the first coil 1430 may be disposed on the another side surface of the housing 1100, parallel to the optical axis direction and located opposite to the one side surface, and the second coils 1730 may be installed on two remaining side surfaces of the housing 1100 disposed opposite to each other, respectively.

The second magnet 1720 is magnetized to have at least N and S poles in the second direction (Y-axis direction) in which a surface opposite to the second coil 1730 is perpendicular to the optical axis direction. Accordingly, when power is applied to the second coil 1730, the lens holder 1700 generates force to move in the second direction (Y-axis direction) according to an electromagnetic interaction between the second magnet 1720 and the second coil 1730. The first direction (X axis direction) and the second direction (Y axis direction) may be perpendicular to each other.

One or two or more second coils 1730 may be disposed on each of the remaining side surfaces of the housing 1100 and correspondingly, one or two or more second magnets 1720 may also be disposed to face the one or two or more second coils 1730.

The first coil 1430 and the second coil 1730 may be fixed to a substrate 1130 together with the focus adjustment driving coil 1330 of the focus adjustment unit, and the substrate 1130 may be fixed to the housing 1100. Accordingly, the substrate 1130 may be provided to surround the four side surfaces of the housing 1100.

The frame 1400 may be provided with a first ball member 1470 disposed between the opposing surfaces of the frame 1400 and the carrier 1300 in the optical axis direction so as to easily slide or roll on an upper portion of the carrier 1300, and may be provided with a second ball member 1770 disposed between the frame 1400 and a surface of the lens holder 1700 perpendicular to the optical axis direction so as to easily slide or roll on an upper surface of the frame 1400.

A first guide groove 1475 formed to be elongated in the first direction (X axis direction) so that the first ball member 1470 easily slides or rolls may be disposed on at least one of the opposing surfaces of the frame 1400 and the carrier 1300 in the optical axis direction. Accordingly, the frame 1400 may move in the first direction (X axis direction) while movement of the frame 1400 in the second direction (Y axis direction) is restricted.

However, when the frame 1400 moves, the lens holder 1700, which is disposed inside the frame 1400 also moves, so that a position of the lens holder 1700 in the first direction (X axis direction) may be changed.

In addition, a second guide groove 1775 formed to be elongated in the second direction (Y axis direction) so that the second ball member 1770 easily slides or rolls may be disposed on at least one of the opposing surfaces of the lens holder 1700 and the frame 1400 facing in the optical axis direction. Accordingly, the lens holder 1700 may move in the second direction (Y axis direction) in a state in which movement of the lens holder 1700 in the first direction (X axis direction) inside the frame 1400 is restricted.

Accordingly, the second magnet 1720 and the second coil 1730 respectively disposed in the lens holder 1700 and the frame 1400, may move relative to each other in the second direction (Y axis direction) while a distance between the opposing surfaces is continuously changed. This is because the frame 1400, which is disposed in the carrier 1300, continuously or intermittently moves in the first direction (X axis direction) for optical image stabilization.

When the second magnet 1720 and the second coil 1730 are provided on only one of the other two side surfaces of the housing 1100, driving force of the second magnet 1720 and the second coil 1730 may not work properly.

Figure 7:
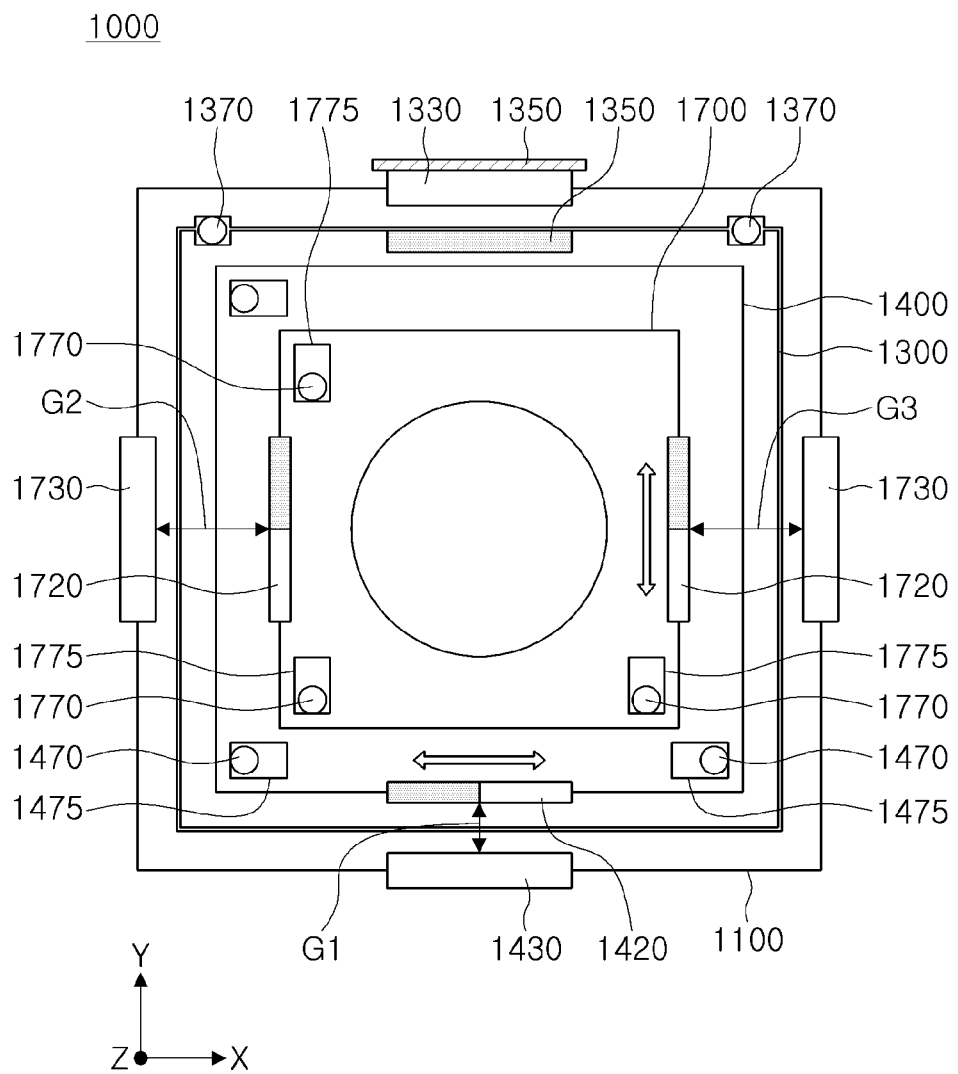
FIG. 7 is a view illustrating driving of the frame and the lens holder of FIG. 5 inside the carrier, according to an embodiment.

Accordingly, as shown in FIG. 7, a gap G1 between the opposing surfaces of the first magnet 1420 and the first coil 1430 forming driving force in the first direction (X axis direction) may be maintained to be the same, a gap G2 or G3 between the opposing surfaces of the second magnet 1720 and the second coil 1730 forming driving force in the second direction (Y-axis direction) may be changed intentionally, and instead, the second magnet 1720 and the second coil 1730 may be respectively provided on two opposing sides of the lens holder 1700 to compensate for the driving force.

That is, the second coils 1730 are provided on the remaining two side surfaces of the housing 1100 opposite to each other, and two second magnets 1720 are respectively provided on opposing surfaces of the lens holder 1700 to face the second coils, respectively, so that even if the two second magnets 1720 move to be biased to any one side, either or both driving units on both sides may be used at the same time in the second direction (Y axis direction) to ensure sufficient optical image stabilization driving force.

The first and second magnets 1420 and 1720 of the optical image stabilization driving unit including the first driving unit and the second driving unit are mounted on the frame 1400 and the lens holder 1700, respectively, and the first and second coils 1430 and 1730 facing the first and second magnets 1420 and 1720, respectively, are mounted on the housing 1100. In some drawings, for convenience of explanation, the first and second coils 1430 and 1730 are shown disposed on the carrier 1300, but referring to FIG. 2, both the first and second coils 1430 and 1730 may be mounted on the housing 1100.

In addition, the first and second magnets 1420 and 1720 are movable magnets that are moved in a direction perpendicular to the optical axis (Z axis) together with the lens module 1500, and the first and second coils 1430 and 1730 are fixed members that are fixed to the housing 1100. However, the disclosure is not limited to the foregoing example, and the positions of the magnets 1420 and 1720 and the coils 1430 and 1730 may be changed with each other.

In addition, a closed loop control continuously sensing a position of the frame 1400 and the lens holder 1700 and reflecting the same in driving may be used in the optical image stabilization driving unit. Accordingly, first and second position sensors 1360 and 1760 facing the first and second magnets 1420 and 1470, respectively, may be provided to sense the position of the frame 1400 and the lens holder 1700. In this case, the first and second position sensors 1360 and 760 may be disposed inside or nest to the first and second coils 1430 and 1730 of the substrate 1130. The first and second position sensors 1360 and 1760 may be magnetic sensors, for example, hall sensors, or the like.

In addition, both structures in which the first and second magnets 1420 and 1720 respectively disposed in the frame 1400 and the lens holder 1700 and the first and second coils 1430 and 1730 opposing each other are provided in one or two or more structures, respectively, are included.

The camera module 1000 has a structure in which the housing 1100, the carrier 1300, the frame 1400, and the lens module 1500 are sequentially provided in an optical axis direction. In the camera module 1000, the carrier 1300 may move in the optical axis direction to implement autofocus adjustment AF, and the frame 1400 and the lens module 1500 may move in the first and second directions perpendicular to the optical axis from above the carrier 1300 to implement optical image stabilization OIS.

FIGS. 8 to 13 illustrate a camera module 2000, according to an embodiment. The camera module 1000 and the camera module 2000 include the same reference numerals for most structures thereof because most of the structures are the same. However, some structural portions in which the frame 1400 is supported on the carrier 1300 having a structural difference will be described with different reference numerals.

The camera module 1000 has a structure in which the carrier 1300, the frame 1400, and the lens holder 1700, which are sequentially provided in an optical axis direction, are maintained in close contact with each other in the optical axis direction. On the other hand, in the camera module 2000, a structure in which the carrier 1300, the frame 1400, and the lens holder 1700 are disposed sequentially in the optical axis direction and a structure in which the lens holder 1700 is supported on an opposing surface of the frame 1400 in the optical axis direction are the same as each other, but there is a difference in that the frame 1400 is supported on a surface parallel to the optical axis direction of the carrier 1300. Hereinafter, a difference between the camera module 2000 and the camera module 1000 will be mainly described.

Figure 3:
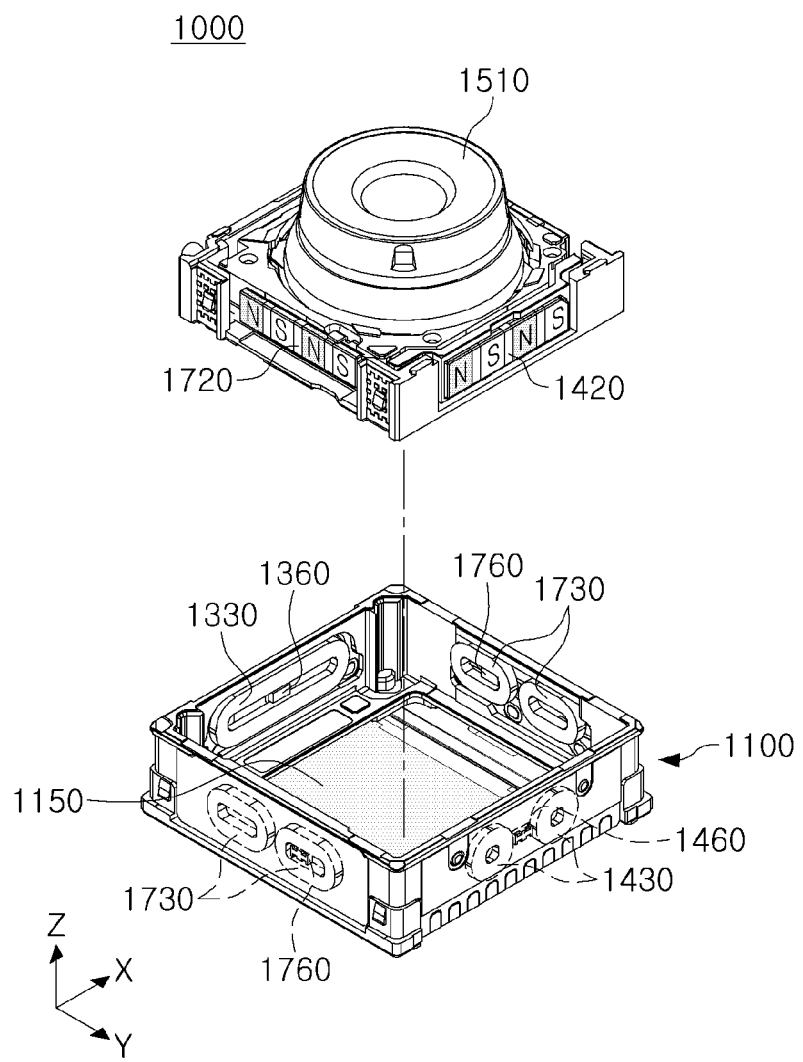
FIG. 3 is an exploded perspective view of a housing and a carrier, according to an embodiment.
Figure 4:
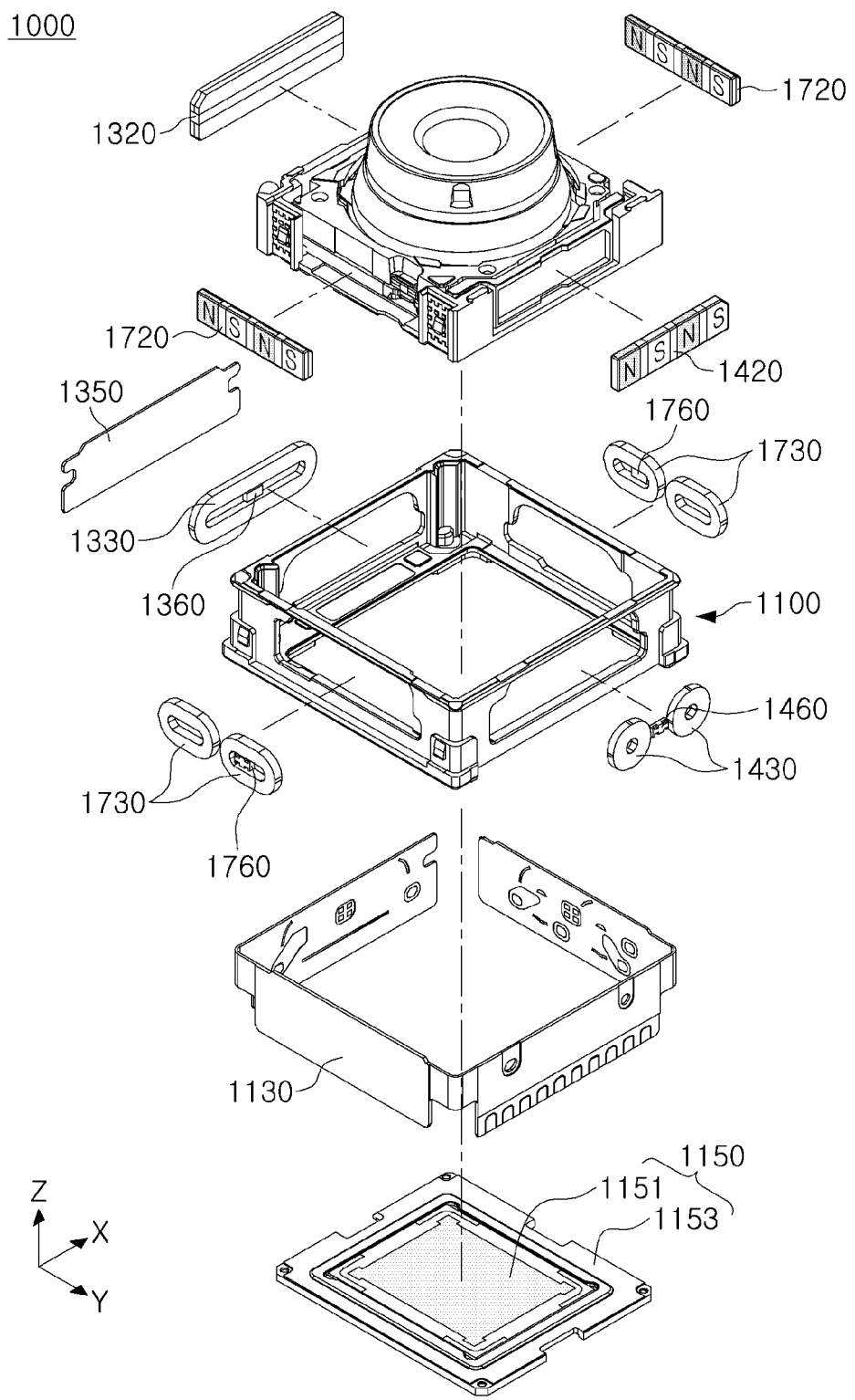
FIG. 4 is an exploded perspective view of the housing, the carrier, a frame, and a lens module of FIG. 3, according to an embodiment.
Figure 5:
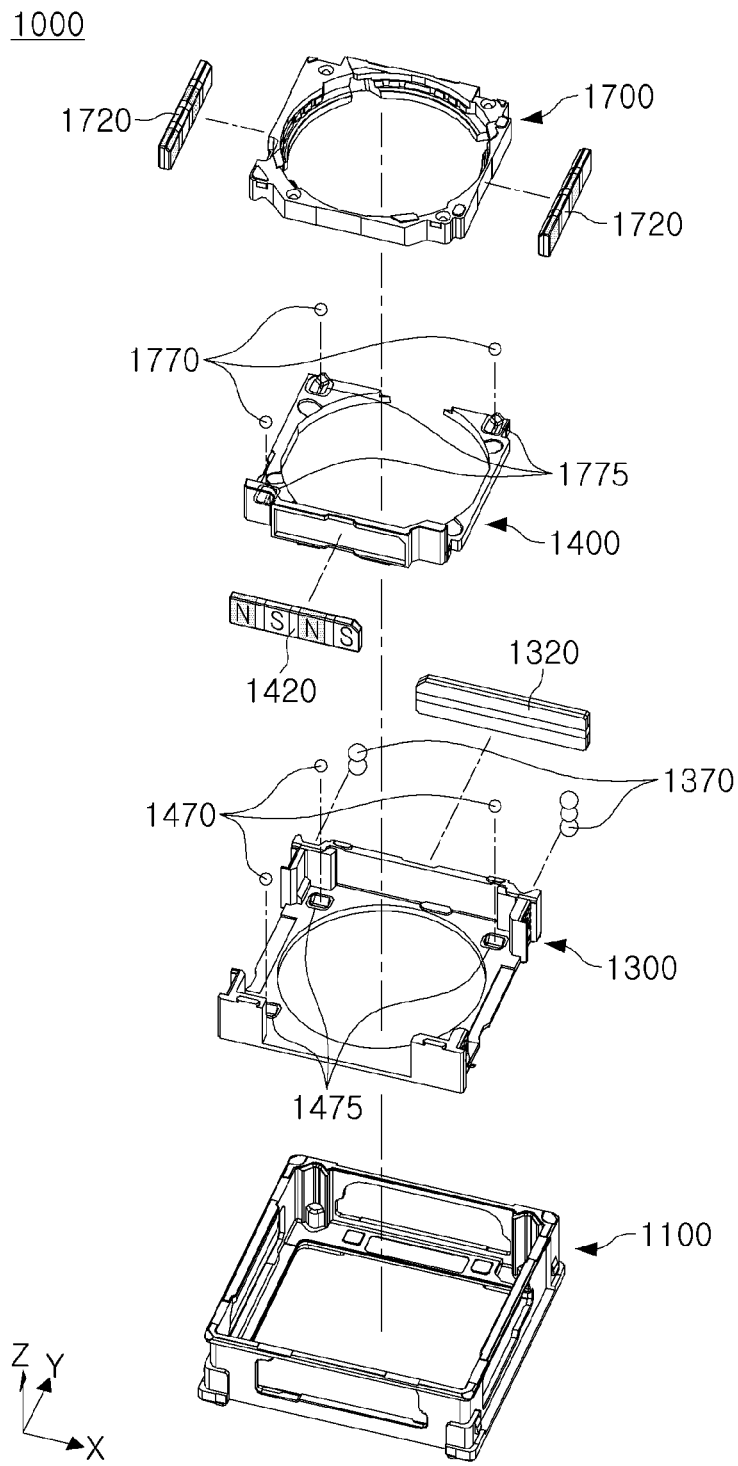
FIG. 5 is an exploded perspective view of the housing, the carrier, the frame and a lens holder of FIG. 4, according to an embodiment, as viewed from above.
Figure 6:
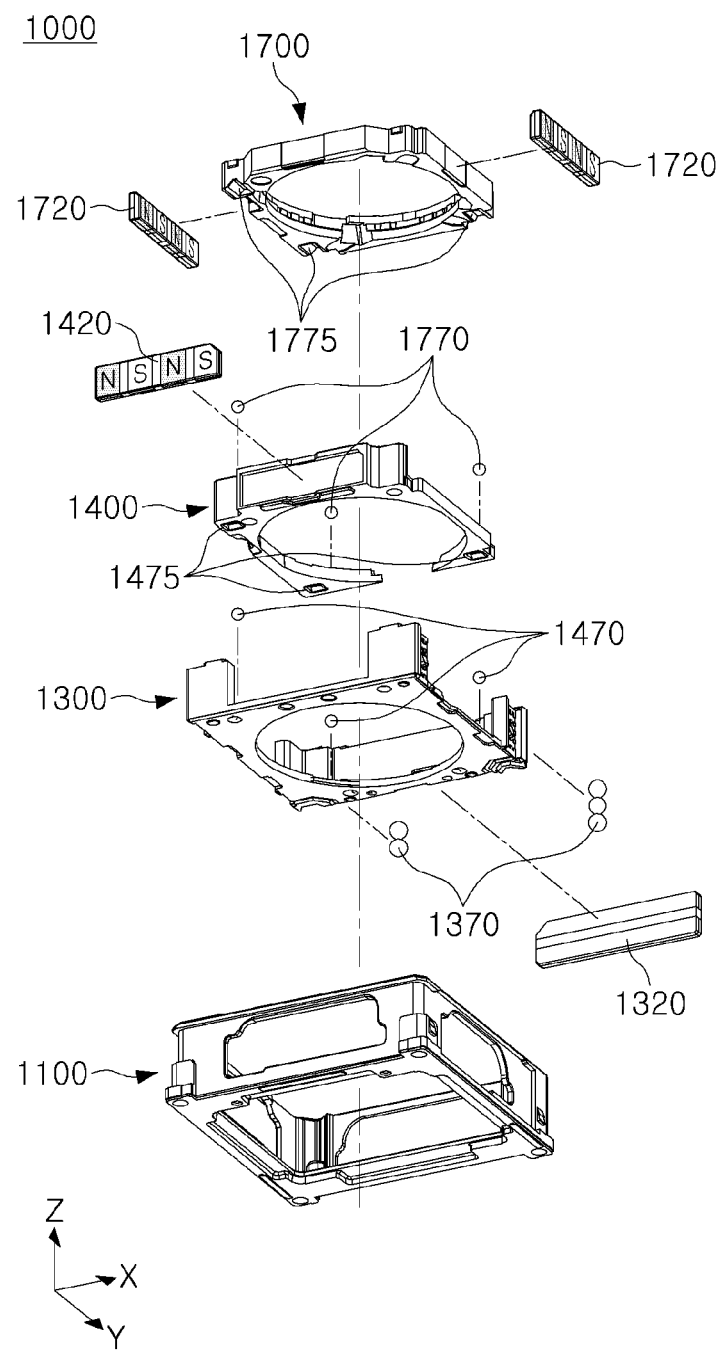
FIG. 6 is an exploded perspective view of the housing, the carrier, the frame and the lens holder of FIG. 5, according to an embodiment.
Figure 9:
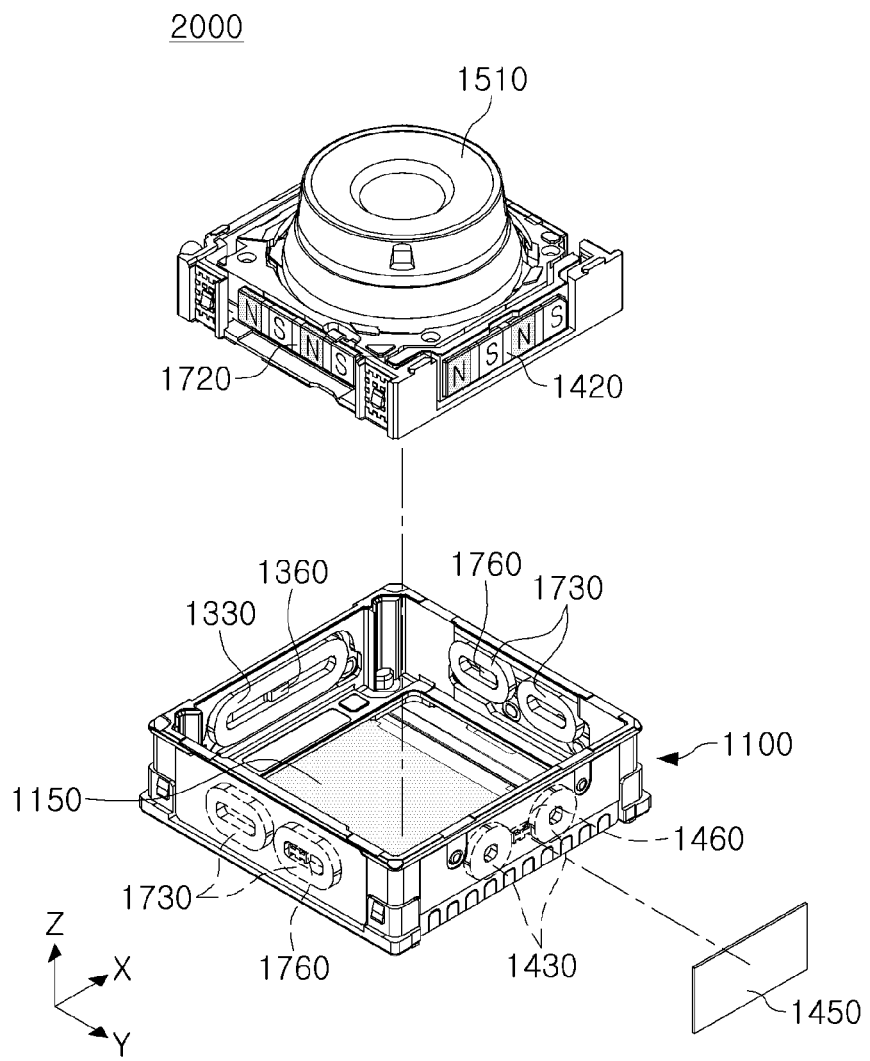
FIG. 9 is an exploded perspective view of a housing and a carrier, according to an embodiment.
Figure 10:
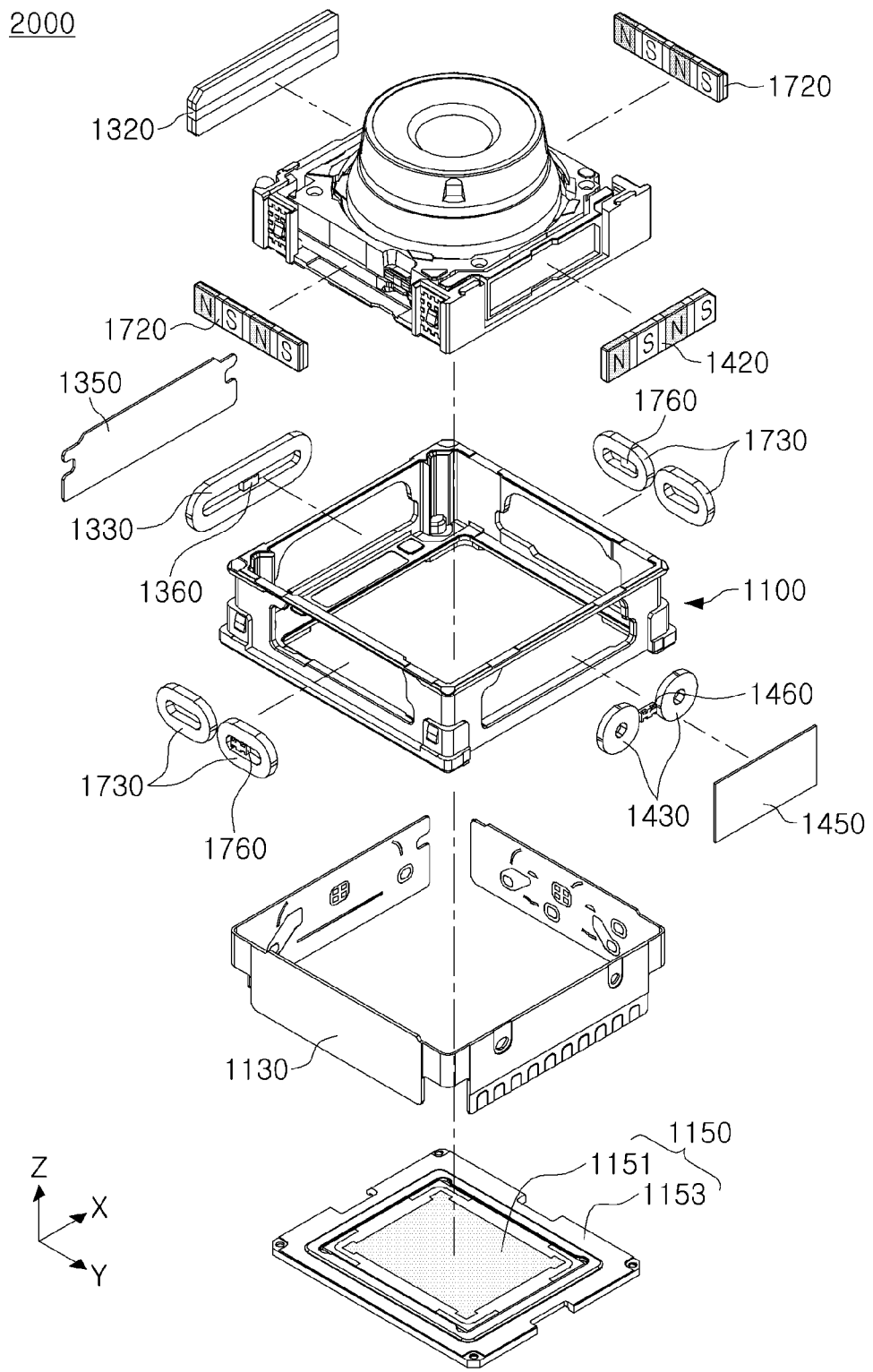
FIG. 10 is an exploded perspective view of the housing, the carrier, a frame, and a lens module of FIG. 9, according to an embodiment.
Figure 11:
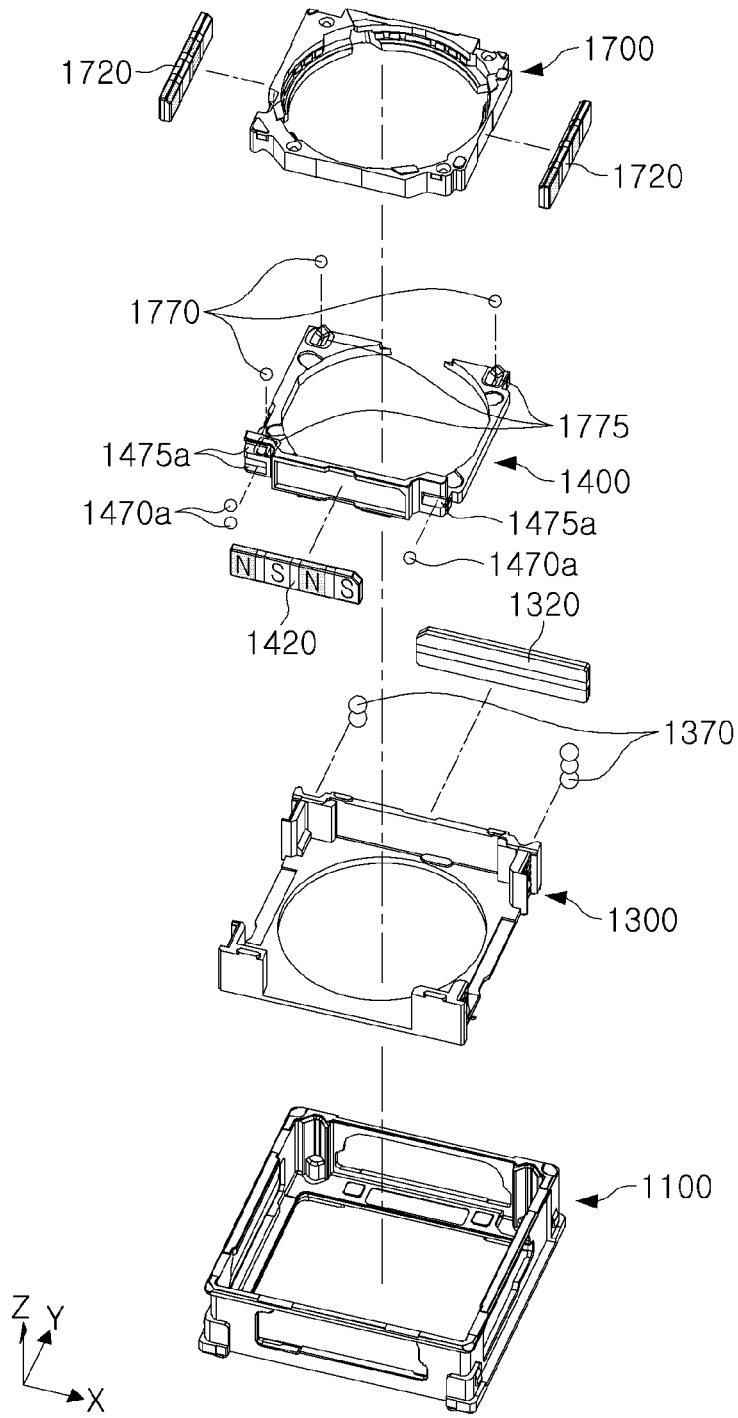
FIG. 11 is an exploded perspective view of the housing, the carrier, the frame and a lens holder of FIG. 10, according to an embodiment, as viewed from above.
Figure 12:
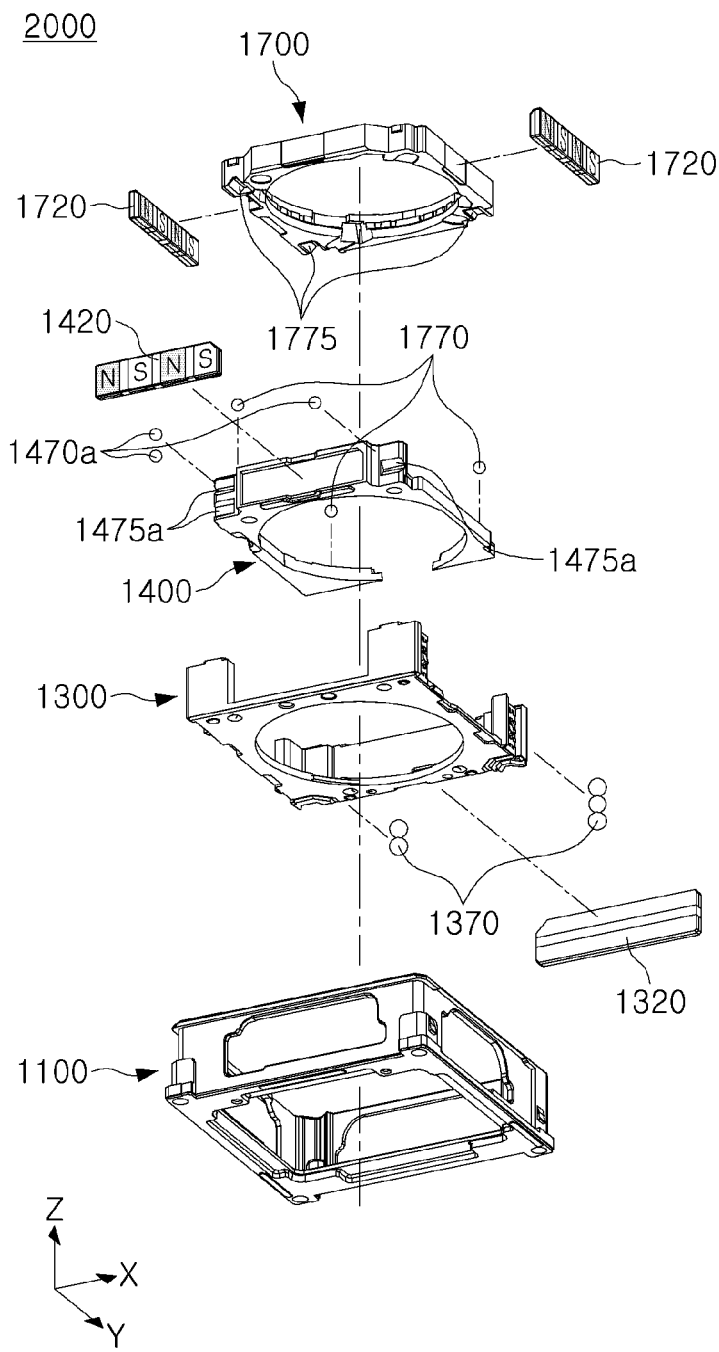
FIG. 12 is an exploded perspective view of the housing, the carrier, the frame and the lens holder of FIG. 10, according an embodiment, as viewed from the bottom.

Referring to FIGS. 8 and 9, the camera module 2000 includes a focus adjustment unit among the lens driving device 1200. Since the corresponding structure of the focus adjustment unit of the camera module 2000 is the same as the structure described in the embodiment 1000 with reference to FIGS. 2 and 3, a detailed description thereof will be omitted.

Referring to FIGS. 8 and 10 to 12, the camera module 2000 includes an optical image stabilization unit of the lens driving device 1200. Since the structure is mostly the same as the structure described with reference to FIGS. 2 and 4 to 6, the description of the overall detailed structure is omitted, and a structure supported on a plane parallel to the optical axis direction with respect to the carrier 1300 of the frame 1400, which is structurally differentiated, will be mainly described.

The lens driving device 1200 includes a focus adjustment unit and an optical image stabilization unit. A basic of the lens driving device 1200 is substantially the same as that described in the camera module 1000.

The optical image stabilization unit includes a structure configured to generate driving force to move the lens module 1500 accommodated in the carrier 1300 in the first direction (X-axis direction) and the second direction (Y axis direction), perpendicular to the optical axis (Z axis). Here, the first direction and the second direction may be perpendicular to each other.

In the camera module 2000 of, a structure by which the carrier 1300 supports the frame 1400 to move in the first direction (X-axis direction), among the structures of the shake correction unit, differs from the corresponding structure in the camera module 1000.

The optical image stabilization unit includes the frame 1400 and the lens module 1500, which includes the lens holder 1700 and the lens barrel 1510, sequentially disposed inside the carrier 1300 in the optical axis direction. The lens barrel 1510 is coupled to the lens holder 1700.

In the optical image stabilization unit of the camera module 2000, in a state shown in the drawings, as the frame 1400 and the lens holder 1700 are moved in the first direction (X axis direction) and the second direction (Y axis direction), respectively, the lens barrel 1510 may be moved together with the frame 1400 and the lens holder 1700 according to movements thereof, so that optical image stabilization may be implemented. By such a structure, when the frame 1400 moves in the first direction (X axis direction) or the lens holder 1700 moves in the second direction (Y axis direction), the lens barrel 1510 may move with the frame 1400 or the lens holder 1700, and shaking may be corrected.

The driving unit of the optical image stabilization unit includes a first driving unit configured to drive the frame 1400 and a second driving unit configured to drive the lens holder 1700.

The carrier 1300, the frame 1400, and the lens holder 1700 are sequentially arranged, the frame 1400 is mounted to be movable with respect to the carrier 1300 in the first direction (X axis direction) perpendicular to the optical axis direction, and the lens holder 1700 mounted to be movable with respect to the frame 1400 in the second direction (Y axis direction), perpendicular to the optical axis direction.

Accordingly, at least three third ball members 1470a may be disposed between the opposing surfaces of the carrier 1300 and the frame 1400, perpendicular to the optical axis direction, and at least three second ball members 1770 may be disposed between the opposing surfaces of the frame 1400 and the lens holder 1700 in the optical axis direction.

In more detail, the third ball member 1470a may be disposed at a position opposite to the ball member for focus adjustment 1370 with respect to the optical axis. In other words, the ball member 1370, which is disposed between the carrier 1300 and the housing 1100 and used as a rolling unit for focus adjustment driving, may be disposed on a side opposite to a side on which the third ball member 1470a is disposed with respect to the optical axis.

Attractive force may be applied to the carrier 1300 and the frame 1400 to maintain the carrier 1300 and the frame 1400 in close contact in a direction perpendicular to the optical axis direction, and attractive force may be applied to the frame 1400 and the lens holder 1700 to maintain the frame 1400 and the lens carrier in close contact with each other in the optical axis direction. To this end, the carrier 1300 is provided with a first yoke 1450 on a rear surface of the first coil 1430 so that the attractive force may be applied to the first magnet 1420 disposed in the frame 1400 in a direction perpendicular to the optical axis direction.

In addition, an upper magnetic material and a lower magnetic material may be disposed on opposing surfaces of the frame 1400 and the lens holder 1700 in the optical axis direction to face each other, so that attractive force can be formed in the optical axis direction.

For example, both the upper magnetic material and the lower magnetic material may be magnets so that attractive force acts, or one of the upper magnetic material and the lower magnetic material may be a magnet and the other may be a yoke having magnetism. In this case, the upper magnetic material may be the second magnet 1720 for driving optical image stabilization provided in the lens holder 1700. In this case, the second yoke 1721 may be provided to the frame 1400 to face the second magnet 1720 in the optical axis direction.

The frame 1400 includes the first magnet 1420, and the first magnet 1420 is disposed to face a first coil 1430 disposed in the housing 1100 in a second direction (Y-axis direction) perpendicular to the optical axis direction. The first coil 1430 may be mounted on a side surface of the housing 1100. In more detail, the first coil 1430 may be installed on a side surface opposite to the one side surface on which a focus adjustment driving coil 1330 is installed to face the focus adjustment driving coil 1330.

For example, the housing 1100 may be in a shape of a square box having four side surfaces, and a focus adjustment coil driving 1330 may be disposed on one side surface of the housing 1100, parallel to an optical axis direction, and the first coil 1430 may be installed on another side surface of the housing 1100 parallel to the optical axis direction and located opposite to the one side surface of the housing 1100.

The first magnet 1420 is magnetized to have at least N and S poles in a first direction (X axis direction) in which a surface opposite to the first coil 1430 is perpendicular to the optical axis direction. Accordingly, when power is applied to the first coil 1430, the frame 1400 generates force to move in a first direction (X axis direction) according to an electromagnetic interaction between the first magnet 1420 and the first coil 1430.

One or two or more first coils 1430 may be provided on a side surface of the housing 1100, and correspondingly, one or two or more first magnets 1420 may be disposed to face the one or two or more first coils 1430.

In addition, a lens holder 1700 includes a second magnet 1720, and the second magnet 1720 may be disposed to face the second coil 1730 disposed in the housing 1100 in the first direction (X axis direction) perpendicular to the optical axis direction. The second coil 1730 may be mounted on all remaining two side surfaces of the housing 1100. For example, the second coil 1730 may be mounted on all of the other side surfaces between the one side surface and the other side surface on which the focus adjustment driving coil 1330 and the first coil 1430 are installed. That is, the second coil 1730 may be installed in pairs opposing each other on the remaining side surfaces opposing each other.

For example, the housing 1100 may be in a shape of a square box having four side surfaces, and the focus adjustment driving coil 1330 may be disposed on one side surface of the housing 1100 parallel to the optical axis direction, the first coil 1430 may be disposed on another side surface of the housing 1100 parallel to the optical axis direction and located opposite to the one side surface, and the second coils 1730 may be installed on two remaining side surfaces of the housing 1100 disposed opposite to each other, respectively.

The second magnet 1720 is magnetized to have at least N and S poles in a second direction (Y axis direction) in which a surface opposite to the second coil 1730 is perpendicular to the optical axis direction. Accordingly, when power is applied to second coil 1730, the lens holder 1700 generates force to move in the second direction (Y axis direction) according to an electromagnetic interaction between the second magnet 1720 and the second coil 1730. The first direction (X axis direction) and the second direction (Y axis direction) may be perpendicular to each other.

One or two or more second coils 1730 may be disposed on each of the remaining side surfaces of the housing 1100, respectively, and correspondingly, one or two or more second magnets 1720 may also be disposed to face the one or two or more second coils 1730.

The first coil 1430 and the second coil 1730 may be fixed to the substrate 1130 together with the focus adjustment driving coil 1330 of the focus adjustment unit, and the substrate 1130 may be fixed to the housing 1100. Accordingly, the substrate 1130 may be configured to surround the four side surfaces of the housing 1100.

The frame 1400 may be provided with a third ball member 1470a disposed between the carrier 1300 and the opposing surface of the frame 1400 in a direction perpendicular to the optical axis direction to easily slide or roll on a side surface of the carrier 1300, and the lens holder 1700 may be provided with the second ball member 1770 disposed between the frame 1400 and a surface perpendicular to the optical axis direction to easily slide or roll on an upper surface of the frame 1400.

A third guide groove 1475a formed to be elongated in the first direction (X axis direction) so that the third ball member 1470a easily slides or rolls in a direction perpendicular to the optical axis direction may be disposed on at least one of the opposing surfaces of the frame 1400 and the carrier 1300. Accordingly, the frame 1400 may move in the first direction (X axis direction) in a state in which movement in the second direction (Y axis direction) is restricted.

Accordingly, the frame 1400 is closely supported by the carrier 1300 in a direction perpendicular to the optical axis direction with the third ball member 1470a interposed between the frame 1400 and the carrier 1300 by attractive force between the first magnet 1420 and the first yoke 1450. Therefore, the first magnet 1420 and the first coil 1430, which are respectively disposed in the frame 1400 and the carrier 1300, may be relatively moved in the first direction (X axis direction) with the opposing surfaces while maintaining the same distance between the first magnet 1420 and the first coil 1430.

However, when the frame 1400 moves, since the lens holder 1700, which is disposed inside the frame 1400 also moves, a position of the lens holder 1700 in the first direction (X axis direction) may be changed.

In addition, the second guide grove 1775 formed to be elongated in a second direction (Y axis direction) so that the second ball member 1770 easily slides or rolls may be provided on at least one of the opposing surfaces of the lens holder 1700 and the frame 1400 facing each other in the optical axis direction. Accordingly, the lens holder 1700 may move in the second direction (Y axis direction) in a state in which movement thereof in the first direction (X axis direction) is restricted.

Accordingly, the second magnet 1720 and the second coil 1730, which are disposed in the lens holder 1700 and the frame 1400, respectively, may move relative to each other in the second direction (Y axis direction) while a gap between the opposing surfaces of the second magnet 1720 and the second coil 1730 is continuously changed. This is because the frame 1400 provided in the carrier 1300 continuously or intermittently moves in the first direction (X axis direction) for optical image stabilization.

If the second magnet 1720 and the second coil 1730 were disposed on only one of the other two side surfaces of the housing 1100, driving force of the second magnet 1720 and the second coil 1730 may not act appropriately according to the continuous change in the gap of the opposing surfaces of the second magnet 1720 and the second coil 1730.

Figure 13:
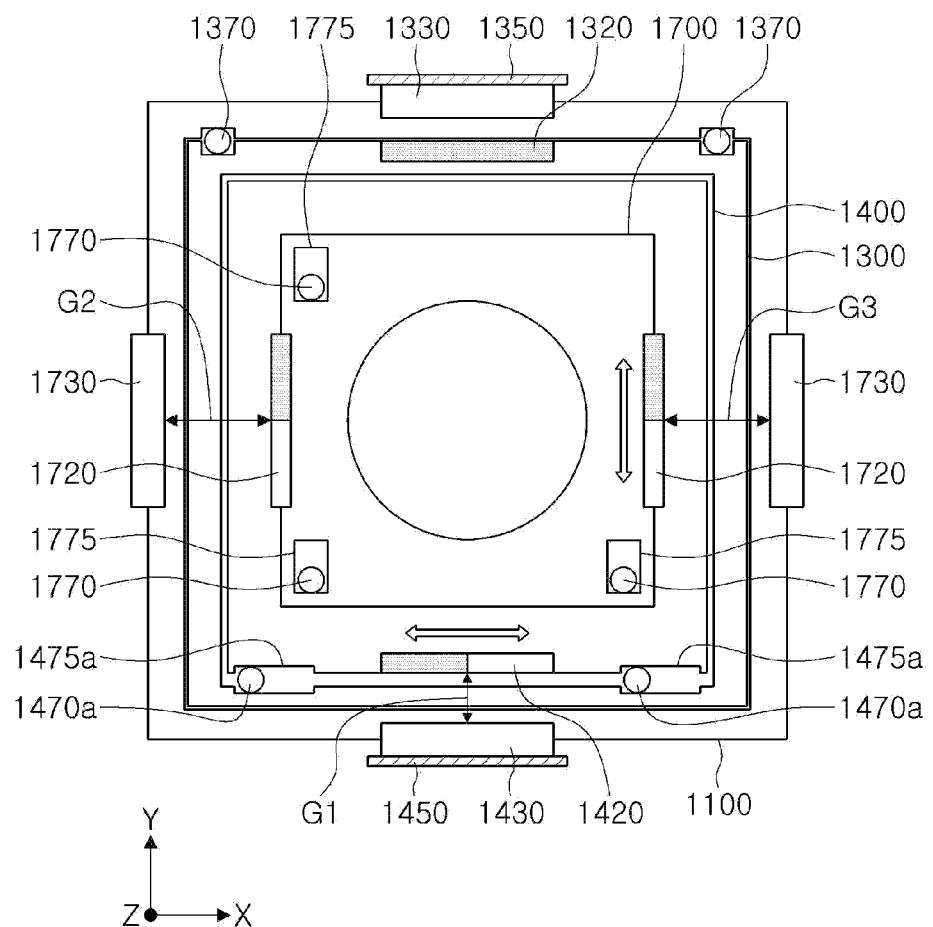
FIG. 13 is a view illustrating driving of the frame and the lens holder of FIG. 10 inside the carrier, according to an embodiment.

Accordingly, as shown in FIG. 13, in this embodiment, a gap G1 between the opposing surfaces of the first magnet 1420 and the first coil 1430 forming driving force in the first direction (X axis direction) is maintained to be the same, a gap G2 or G3 between the opposing surfaces of the second magnet 1720 and the second coil 1730 forming driving force in the second direction (Y axis direction) can be intentionally changed. Thus, the second magnet 1720 and the second coil 1730 may be respectively provided on both sides of the lens holder 1700 to compensate for the driving force.

That is, the second coils 1730 are respectively disposed on the remaining two side surfaces of the housing 1100 opposing each other, and two second magnets 1720 are respectively provided on opposing surfaces of the lens holder 1700 to face the second coils, respectively. Even if the lens holder 1700 is moved to be biased toward either side of the housing 1100, the shake compensation driving force in the second direction (Y axis direction) can be sufficiently secured by using either one of the driving units of both sides or the driving units of both sides at the same time.

As set forth above, according to embodiments disclosed herein, an actuator having a novel structure including a magnet and a coil is provided.

In addition, according to embodiments disclosed herein, optical image stabilization may be sufficiently implemented by a long stroke by employing an actuator using a magnet and a coil.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera module, comprising:
   a housing;
   a carrier disposed inside the housing and supported by the housing and configured to be movable in an optical axis direction; and
   a lens module disposed inside the carrier and movable in directions perpendicular to the optical axis direction, and configured to implement optical image stabilization,
   wherein the lens module includes a frame disposed on the carrier, and a lens holder disposed on the frame and having a lens barrel, and
   wherein the frame is configured to be supported by a first ball member interposed between the frame and the carrier on a side surface of the carrier parallel to the optical axis direction, and
   a direction in which the frame is supported by the carrier is parallel to a direction in which the carrier is supported by the housing.

2. The camera module of claim 1, wherein a size of a gap between the side surface of the carrier and a side surface of the frame opposing the side surface of the carrier is continuously maintained during driving of an optical image stabilization actuator.

3. The camera module of claim 1, wherein the frame is movable in a first direction perpendicular to the optical axis direction with respect to the carrier.

4. The camera module of claim 3, further comprising a first magnet disposed on a side surface of the frame opposing the side surface of the carrier.

5. The camera module of claim 4, wherein the first magnet is magnetized to have N and S poles in the first direction.

6. The camera module of claim 5, further comprising a first coil disposed in the housing to oppose the first magnet.

7. The camera module of claim 6, wherein the first coil comprises at least two first coils sequentially disposed in the first direction.

8. The camera module of claim 7, wherein the first magnet includes at least two pairs of the N and S poles, and
wherein each of the at least two first coils is disposed to oppose a respective pair of N and S poles among the at least two pairs of N and S poles.

9. The camera module of claim 4, further comprising a first yoke disposed in the housing such that attractive force with the first magnet acts on a rear surface of the first coil opposing the first magnet.

10. The camera module of claim 1, wherein the lens holder is supported by a second ball member interposed between opposing surfaces of the lens holder and the frame in the optical axis direction.

11. The camera module of claim 1, wherein the carrier is supported by a second ball member interposed between the carrier and a side surface of the housing parallel to the optical axis direction.

12. The camera module of claim 11, wherein the first ball member and the second ball member are disposed in opposing positions with respect to an optical axis.

13. The camera module of claim 11, further comprising a magnet disposed on another side surface of the carrier, and a coil disposed in the housing to oppose the magnet.

14. The camera module of claim 13, wherein the magnet is magnetized so that a surface opposite to the coil has N and S poles in the optical axis direction.

15. A camera module, comprising:
a box-shaped housing;
a carrier disposed inside the housing and movable in an optical axis direction;
a lens module disposed inside the carrier and movable in directions perpendicular to the optical axis direction, the lens module including a frame disposed on the carrier, and a lens holder disposed on the frame and including a lens barrel;
first and third coils respectively disposed on first and third opposing sides with respect to the optical axis;
second and fourth coils respectively disposed on second and fourth opposing sides with respect to the optical axis;
a first yoke disposed on a rear surface of the first coil such that the carrier is supported on a side surface of the housing by attractive force with a first magnet opposing the first coil on the carrier; and
a second yoke disposed on a rear surface of the third coil such that the frame is supported on a side surface of the carrier by attractive force with a third magnet opposing the third coil on the frame,
wherein ball members are interposed between the carrier and the housing and between the frame and the carrier, respectively, and
wherein the lens holder includes second and fourth magnets opposing the second and fourth coils, respectively.

16. The camera module of claim 15, wherein the first magnet is magnetized to have N and S poles in an optical axis direction, the third magnet is magnetized to have N and S poles in a first direction perpendicular to the optical axis, and the second and fourth magnets are magnetized to have N and S poles in a second direction perpendicular to both the optical axis and the first direction.

17. The camera module of claim 15, wherein the first and third coils are respectively disposed on first and third opposing side surfaces of the housing, and the second and fourth coils are respectively disposed on second and fourth opposing side surfaces of the housing.

18. The camera module of claim 15, wherein the first coil and the first magnet are configured to interact with each other to move the carrier in the optical axis direction.

19. The camera module of claim 15, wherein the second coil and the second magnet are configured to interact with each other to move the lens module in a first direction among the directions perpendicular to the optical axis, the third coil and the third magnet are configured to interact with each other to move the lens module in a second direction, among the directions perpendicular to the optical axis, and the fourth coil and the fourth magnet are configured to interact with each other to move the lens module in the first direction.

* * * * *